(12) United States Patent
Knisely et al.

(10) Patent No.: US 7,352,717 B2
(45) Date of Patent: Apr. 1, 2008

(54) PERFORMING NETWORK CONTROL AT ACTIVE BASE TRANSCEIVER STATIONS AND A BASE STATION CONTROLLER

(75) Inventors: Douglas N. Knisely, Wheaton, IL (US); David Albert Rossetti, Randolph, NJ (US); Subramanian Vasudevan, Morristown, NJ (US); Yunsong Yang, Piscataway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1091 days.

(21) Appl. No.: 10/158,219

(22) Filed: May 31, 2002

(65) Prior Publication Data

US 2003/0223400 A1    Dec. 4, 2003

(51) Int. Cl.
*H04Q 7/00* (2006.01)

(52) U.S. Cl. ............... 370/329; 370/331; 370/335; 455/437; 455/442

(58) Field of Classification Search .......... 370/330, 370/333; 455/438, 439, 115.3
See application file for complete search history.

(56) References Cited

U.S. PATENT DOCUMENTS

| 5,982,758 | A | * | 11/1999 | Hamdy | 370/331 |
|---|---|---|---|---|---|
| 6,072,790 | A | * | 6/2000 | Neumiller et al. | 370/338 |
| 6,249,252 | B1 | * | 6/2001 | Dupray | 342/450 |
| 6,430,414 | B1 | * | 8/2002 | Sorokine et al. | 455/442 |
| 6,597,705 | B1 | * | 7/2003 | Rezaiifar et al. | 370/468 |
| 6,799,045 | B1 | * | 9/2004 | Brouwer | 455/453 |
| 6,834,190 | B1 | * | 12/2004 | Lee et al. | 455/436 |
| 7,006,828 | B1 | * | 2/2006 | Czaja et al. | 455/442 |

FOREIGN PATENT DOCUMENTS

| EP | 0504122 | 9/1992 |
|---|---|---|
| EP | 1032237 | 8/2000 |
| WO | 0149061 | 7/2001 |

* cited by examiner

*Primary Examiner*—Doris H. To
*Assistant Examiner*—Ian N. Moore

(57) ABSTRACT

A method for performing network control in wireless communication systems and a network entity for performing the same. The method and network entity pool at least one network parameter at the network entity, from at least two active set base transceiver stations and determine a current status of a mobile in the wireless communication system, using the pooled network parameters. The active set base transceiver stations may include a serving base transceiver station and a target base transceiver station. The network parameter may be a confidence metric and/or an error metric for each of a plurality of hypotheses, a power up/power down signal, and/or a measured signal-to-noise ratio and/or energy parameter of a pilot signal from the mobile. The current status of the mobile to be determined may be the mobile's decision to switch to the target base transceiver station transceiver or which base transceiver station transceiver the mobile is currently communication with. The network entity may be a base station controller or a base transceiver station in the active set of base transceiver station transceivers for the mobile in question.

20 Claims, 3 Drawing Sheets

PERFORMING NETWORK CONTROL AT ACTIVE BASE TRANSCEIVER STATIONS AND A BASE STATION CONTROLLER

BACKGROUND OF THE INVENTION

1. Field of the Invention

The present invention relates to communication systems, and more particularly, to wireless communication systems.

2. Description of the Related Art

Wireless communication systems are typically configured as cellular communication systems which comprise a plurality of cells each of which contains system equipment that is part of the wireless communication system. A cell is a geographical area with defined boundaries and contains system communication equipment such as a base transceiver station (BTS) that conveys (i.e., transmits and/or receives) communication signals to and from mobile equipment. The system equipment comprises typical communication equipment such as transmitters, receivers, transceivers, and processors that convey communication signals within the communication system. The system equipment for a cell may be located at one or more points in the cell. The terms "base transceiver station" and "system equipment" may be used interchangeably. The term "system equipment" may also include non-base transceiver station entities, such as a base station controller (BSC). The system equipment is usually owned, operated and controlled by a service provider or a network provider. Examples of service providers include wireless telephone companies, data network companies and other communication service entities. The mobile equipment is usually owned, operated and to a certain extent, controlled by a user of the communication system. Examples, of mobile equipment include cellular telephones, wireless personal computers, pagers and Personal Digital Assistants (PDA). The information conveyed between the mobile equipment and the system equipment comprise communication signals representing voice, video, and data information. The data information can be textual information, graphical information or any other type of information that is not time sensitive. Voice and video signals represent information that is time sensitive; that is, voice and video signals are conveyed in a continuous manner without any time gaps. When time gaps occur during the transmission of voice or video signals, the gaps are discernible making it difficult for a user to properly interpret the information being carried by the communication signal.

As mobile equipment migrates from cell to cell within the system, the mobile equipment, at some point, may be handed off or switched (depending on the type of traffic being exchanged) from one base transceiver station to another base transceiver station. Hand off and switching procedures are well known concepts. A handoff procedure is used for voice in many different types of cellular wireless communication systems such as Code Division Multiple Access (CDMA) systems, Frequency Division Multiple Access (FDMA) systems and Time Division Multiple Access (TDMA) systems. In CDMA systems, the handoff procedure is termed soft, which implies that the mobile may be in bi-directional voice communication with a multiplicity of base transceiver stations for a period of time as it migrates from one cell to another. A mobile positioned to receive voice information from and transmit voice information to multiple base transceiver stations at the same time is said to be in handoff.

While in a particular cell, mobile equipment is served by the base transceiver station of that cell; that is, information is conveyed between the mobile equipment and the base transceiver station. Information is transmitted from the base transceiver station to the mobile over a communication link commonly referred to as the forward link. Information is received by the base transceiver station from the mobile over a communication link commonly referred to as a reverse link. The forward link—as well as the reverse link—comprises different communication channels for conveying either traffic information or signaling information. Traffic information is the information being received or transmitted by the user. As previously indicated, examples of traffic information include voice, video and data. Signaling information is information generated by the system equipment and also by the mobile equipment to allow the system to control, operate and manage the flow of traffic information in the system. The signaling information is arranged, transmitted and received in accordance with a protocol. A protocol is a set of rules that dictate how signaling information is to be formatted, transmitted and received. A protocol is usually based on a standard defined by standards bodies comprising private commercial entities and/or governmental regulatory bodies.

The handoff procedure identifies particular circumstances under which the system allows a mobile equipment to be simultaneously served by more than one base transceiver station, these base transceiver stations are known as the members of the active set of base transceiver stations. For relatively high-speed data applications, it is preferable to send data to the mobile from one of these base transceiver stations; this base transceiver station is designated the serving base transceiver station for the data application. At some point in time, the migrating mobile equipment may choose to receive data from another base transceiver station (i.e., another cell) in the active set; this base transceiver station is designated as the target base transceiver station for data service. In the context of a CDMA system complying with CDMA 2000 Release C standard, the mobile receives data on the Forward-Packet Data Channel (F-PDCH) from a serving base transceiver station. At some point during the cell switching procedure, the serving base transceiver station stops transmission on the F-PDCH to the mobile. At approximately the same time, the target base transceiver station becomes the serving base transceiver station and resumes transmissions to the mobile on the F-PDCH. The mobile is thus said to have switched from a serving base transceiver station to a target base transceiver station completing a cell switching procedure. In other words, the mobile has switched cells or the mobile has switched from one cell to another cell. The cell switching procedure is thus performed by the mobile, the serving system equipment and the target system equipment.

During the cell switch, various parameters are received by the serving base transceiver station from the mobile. Also the target base transceiver station receives parameters from the serving base transceiver station. One of the parameters received by the serving base transceiver station from the mobile is the Carrier to Interference ratio (C/I) for the serving base transceiver station. The Carrier to Interference ratio is a measure of a pilot signal that is transmitted in a substantially continuous manner by all of the base transceiver stations in the communication system. The serving base transceiver station, the target base transceiver station as well as all of the other base transceiver stations in the system transmit a pilot signal in a substantially continuous manner over their respective forward pilot channel that is part of the forward link. The mobile equipment being served by the base transceiver stations receive the pilot signals, measure the pilot signals and transmit the measurement (in the form of Carrier to Interference ratio or C/I) for the serving base transceiver station (in the cdma2000 Release C standard). C/I is a measure of the quality of the forward channels in the forward link. Generally speaking the higher the C/I, the better the quality of the forward channel. While a mobile is being served by a base transceiver station, the mobile transmits the C/I to the serving base transceiver station for a defined period of time followed by the transmission of channel measurement adjustment information for another defined period of time. The channel measurement adjustment information is information that is used by the serving base transceiver station to either increase or decrease its transmission power (i.e., the power of its transmitted signals over the forward link), bandwidth, data speed and allocation of time interval on a communication channel so as to adequately and efficiently serve the mobile.

In many CDMA systems, the mobile transmits information to a base transceiver station during a defined time period called a frame. For some of these CDMA communication systems, the frame has a duration of 20 msec. The frame is divided into 16 equal time slots. Thus, each time slot is approximately 1.25 msec. in duration. For such systems that use 20 msec. frames, the mobile transmits the C/I information during the first time slot using 4 bits. Each of the ensuing 15 time slots of the frame are used by the mobile to transmit channel measurement adjustment information that, for example, enables the serving base transceiver station to adjust the power, bandwidth, data speed, and intervals of time allocated to the mobile on the forward data channel.

During the cell switch procedure, the migrating mobile equipment transmits the C/I of the serving base transceiver station. A decreasing C/I measurement is typically an indication that the mobile is moving away from the serving base transceiver station and that the serving base transceiver station should significantly increase the power of its communication signals in order to adequately serve the mobile. The mobile is also tracking the C/I of a target base transceiver station. Usually, when the C/I of the target base transceiver station is increasing, it is an indication that such target base transceiver station is a good candidate to adequately serve the migrating mobile. In CDMA systems that mainly convey data, the mobile can wait until the C/I of the target base transceiver station is sufficiently adequate to initiate and complete the cell switch, taking advantage of the dynamics of the system and decreasing the likelihood of loss of communication and/or an increased occurrence of errors while in handoff. One particular CDMA communication system that conveys mainly data information is the cdma2000 Release C standard previously under development as cdma2000 EVolution for Data and Voice.

Generally, in CDMA communication systems, and in particular, in cdma2000 Release C CDMA communication systems, information transmitted and received by each mobile is coded with a code called a PN (Pseudo-Noise) code which in effect defines a particularly specific communication channel for each mobile in the system. Further, when a mobile wishes to transmit information to a specific base transceiver station, it codes the information with a spreading code called a cover code that specifically identifies that base transceiver station. The spreading code is a code which when applied to a communication signal causes the frequency spectrum of the signal to encompass a relatively wider bandwidth than the bandwidth of the signal without the applied spreading code. One type of spreading code is the well known Walsh code used in CDMA systems. Thus, information transmitted by a mobile to a particular base transceiver station is coded with a PN code identifying the mobile and with a cover code identifying the base transceiver station for which the information is destined. The information is carried by one or more sinusoidal signals (e.g., radio signals) which are modulated and combined in accordance with the value of the PN code and the cover code to form a specific waveform defined by those codes.

Normally, when the mobile does not wish to switch cells, it transmits C/I information of the serving base transceiver station to that base transceiver station during the first time slot of the frame using the cover code of the serving base transceiver station. The C/I information is a 4-bit quantized value of the measured C/I information of the serving base transceiver station. There are currently 8 defined cover codes 6 of which are used by CDMA communication systems that comply with the cdma2000 Release C standard. The remaining two cover codes are not, at the present, used by cdma2000 Release C communication systems. The mobile then transmits 1-bit update information (i.e., channel measurement adjustment information) in each of the ensuing 15 slots of the frame communicating the change in channel quality to the serving base transceiver station. During this time of normal transmission, the frames being transmitted by the mobile are called non-switch frames. For cdma2000 Release C CDMA systems, the frame is contained in a radio signal (combined and modulated by the cover code and the PN code) transmitted by the mobile over a signaling channel of the reverse link called the Reverse Channel Quality Indicator (R-CQICH).

When a migrating mobile wishes to initiate cell switching it notifies the serving base transceiver station in some manner. One way in which the migrating mobile notifies the serving base transceiver station is to transmit a fixed and known value (during, say, slots 14 and 15 of the 20 msec. frame) to the serving base transceiver station using the cover code of the target base transceiver station. Each of the remaining time slots (i.e., 13 remaining time slots) of the frame are used, as before, by the mobile to transmit channel measurement adjustment information about the serving base transceiver station. The C/I information is represented by a 4-bit block of data that is a quantized value of the measured C/I value of the forward link of the serving base transceiver station. The transmission can be received by both the serving and target base transceiver stations. The format of the frames as discussed above (i.e.,two slots transmitted with the cover code of the target with a fixed value describes what is called a switch frame. Therefore, during normal operation (i.e., cell switch is not desired by mobile or network equipment), non-switch frames are transmitted by the mobile over the R-CQICH signaling channel. However, when a mobile desires to switch cells, it transmits switch frames having the format described above. A number of changes may be made to the format of switch frames without substantially altering the mechanism for detecting switching indication by the mobile at the network. For example, the location and number of switch indication slots within a 20 ms frame may be changed based on a directive from the base transceiver station. Also, the transmitted bits during these slots may be either held fixed or represent C/I adjustment information for the serving base transceiver station, or even represent C/I information for the target base transceiver station.

As described above, at any given time, a cdma2000 Release C mobile receives data on the forward packet data channel (F-PDCH) from a single BTS sector. This sector is termed the serving or source BTS sector. At any time during the data call, the mobile may designate a different BTS sector in its active set, from which it desires to receive the F-PDCH. The BTS sector, so designated, is termed the target BTS sector. This action by the mobile is known as cell re-selection or cell switching. A cdma2000 Release C mobile cell signals cell switching via specially formatted transmissions, on the Reverse Channel Quality Indicator Channel (R-CQICH). The current mechanism is shown in the following figure.

Referring to FIG. 1, there is shown the format of non-switch frames (CQICH frames) and switch frames (CQICH/switch indication frame) transmitted by a mobile in a cell A that is switching to cell B. The first slot of the non-switch frame indicates the 4-bit quantized C/I information for the serving cell (i.e., cell A is contained in such slot).

In particular, the first slot includes the Walsh spreading function for sector A for a full C/I update for sector A and the gain for a full C/I update. The ensuing 15 slots of non-switch frame 1 contain, inter alia, 1-bit channel measurement adjustment information for the serving cell A. The ensuing 15 slots include the Walsh spreading function for sector A including differential C/I updates 1-15 for sector A and the gain for the differential C/I updates. In the switch frame, the first slot includes the Walsh spreading function for sector A for a full C/I update for sector A and the gain for a full C/I update. Slots 14 and 15 include the Walsh spreading function for sector B and repeat a fixed value (+1) using the gain for cell switch indication. The remaining 13 slots contain channel measurement adjustment information for serving cell A. The remaining 13 slots include the Walsh spreading function for sector A including differential C/I updates 1-13 for sector A and gain for the differential C/I update. It is noted that there is an interruption in the adjustment information when the switch frame is being transmitted. Non-switch frame 2 is transmitted by the mobile when cell switching is completed meaning that cell B is now serving the mobile. The first slot of non-switch frame 2 contains 4-bit C/I quantized information for the forward link of cell B. This slot includes the Walsh spreading function for sector B including full C/I update for sector B and the gain for the full C/I update. The remaining 15 slots contain 1-bit adjustment information for cell B. The remaining 15 slots include the Walsh spreading function for sector B including differential C/I updates 1-15 for sector B and the gain for the differential C/I update.

Note that multiple consecutive switch frames (from 1 to 16) may be transmitted by the mobile to indicate a switch. The serving base transceiver station also has the ability to release the mobile and allow it to move to the target base transceiver station before all the switch indication frames have been transmitted by the mobile.

In conventional systems, the serving BTS sector attempts to detect a switch indication by a mobile. Detection of a switch indication results in (i) transfer of data intended for the mobile (as well as current state of the data transmission and retransmission protocol) to the target BTS from the serving BTS sector, and (ii) subsequent transmission on the F-PDCH to the mobile from the target BTS.

Since power control of the R-CQICH obeys the or-of-the-downs rule, there is no guarantee of reliable reception at the serving BTS sector. Further, the reverse link channel feedback and acknowledgement channels in cdma2000 Release C systems, that support operation of the forward link packet data channel, do not benefit from handoff reception across non-co-located BTS sectors.

SUMMARY OF THE INVENTION

The present invention is directed to a method for performing network control in a wireless communication system and a network entity for performing network control that pools at least one network parameter at one location, in a preferred embodiment, the system equipment, from at least two active set base transceiver stations and determines a current status of a mobile in the wireless communication system using the pooled networked parameters. The pooled network parameter may be a confidence and/or an error metric for each of a plurality of hypotheses, a power up/power down signal, the signal-to-noise ratio and/or other energy parameter of a pilot signal and/or a quality indicator from another channel being concurrently transmitted by the mobile. The current status of the mobile being determined in the wireless communication system may be a mobile's intention to switch from a serving base transceiver station to a target base transceiver station. Alternatively, the current status of the mobile is which of a plurality of active set base transceiver stations the mobile is currently communicating with. Occasionally, it is unknown which active set base transceiver station a given mobile is communicating with. Such a status can be obtained by the method and network entity of the present invention.

The method and network entity of the present invention may have all active set base transceiver stations monitoring the mobile's transmissions on the R-CQICH channel. The results of the monitoring may then be sent back to the system equipment (such as a base station controller) where a joint decision is made to determine whether or not the mobile has signaled a switch as well as the identity of the target.

The method and network entity of the present invention may also set differing outer-loop targets for reverse link power control, to ensure that the serving sector is also the power controlling sector for the mobile. This will ensure that the required signal-to-noise ratio is more likely to be achieved at the serving sector, and hence switch detection at this sector is made more reliable.

The at least one network parameter may be pooled from a set of active set base transceiver stations which include a serving base transceiver station and a target base transceiver station. Further, the system equipment may be one of the at least two active set based transceiver stations or a base station controller. Where a plurality of hypothesis are used, method and network entity of the present invention may use all possible hypotheses or only likely hypotheses. Still further, the quality indicator from another channel may be a cyclic redundancy check (CRC) or a frame quality indicator and the other channel may be a reverse fundamental channel or a reverse dedicated control channel. The two active set base transceiver stations may be sectors of a single base transceiver station and the pooled parameters are from sectors from the single base transceiver station. The current status of the mobile may be what value of the channel quality the mobile has reported to the network during a current frame. The current status of the mobile may also be whether the mobile has sent a positive or negative acknowledgement to data transmissions received by the mobile on a forward link.

Still further, the at least one network parameter may be a network parameter and the determining operation is a soft combination of the at least one network parameter. Alternatively, the at least one network parameter may be a network decision and the determining operation is a choice among decisions made by the at least two active set base transceiver stations. Still further, the at least two active set based transceiver stations may include a serving base transceiver station and/or target base transceiver station during an/or just after a switch by the mobile.

BRIEF DESCRIPTION OF THE DRAWINGS

The present invention will be better understood from reading the following description of non-limiting embodiments, with reference to the attached drawings, wherein below.

DETAILED DESCRIPTION

For clarity of discussion the method and network entity of the present invention will be discussed in the context of a cdma2000 Release C CDMA wireless communication system in which a mobile indicates its intent to switch cells by transmitting coded information (having one or more switching) frames to its system equipment whereby the switching frame is 20 msec in duration and is divided into 16 equal time slots. Further, the mobile indicates which base transceiver station it intends to switch to by coding the waveform carrying the switching information with a cover code assigned to the target base transceiver station. currently, there are 8 defined cover codes, only 6 of which are used by current cdma2000 Release C systems. It will be readily understood by one skilled in the art to which this invention belongs that the method of the present invention is not limited to cdma2000 Release C CDMA communication systems but can certainly be used in other wireless CDMA communication systems or other wireless communication that use coded information as defined above.

One of the general concepts of the present invention is that all (or a subset of) active set base transceiver stations detect a cell switch and report results to system equipment (such as a base station controller) every 20 ms (or at the end of the switch indication period within each 20 ms period). Each report is accompanied by additional metrics such as (i) confidence levels associated with the detection, (ii) pilot target SNR achieved, (iii) power control commands sent to the mobile at the time when the cell switch was detected.

If there is a fundamental channel, the base station controller may rely on the cell switch report from the sector with best frame quality indication on the R-FCH or R-DCCH. Otherwise a joint decision is made based on the reported information from the active set base transceiver stations. If the BSC misses the switch, or false-detects the switch, a supervision procedure may be implemented, which is discussed in more detail below.

In the case where the mobile is in softer-only handoff, the base transceiver station at which both source and target sectors are co-located, performs the function of the BSC in the soft handoff case.

Figure 1:
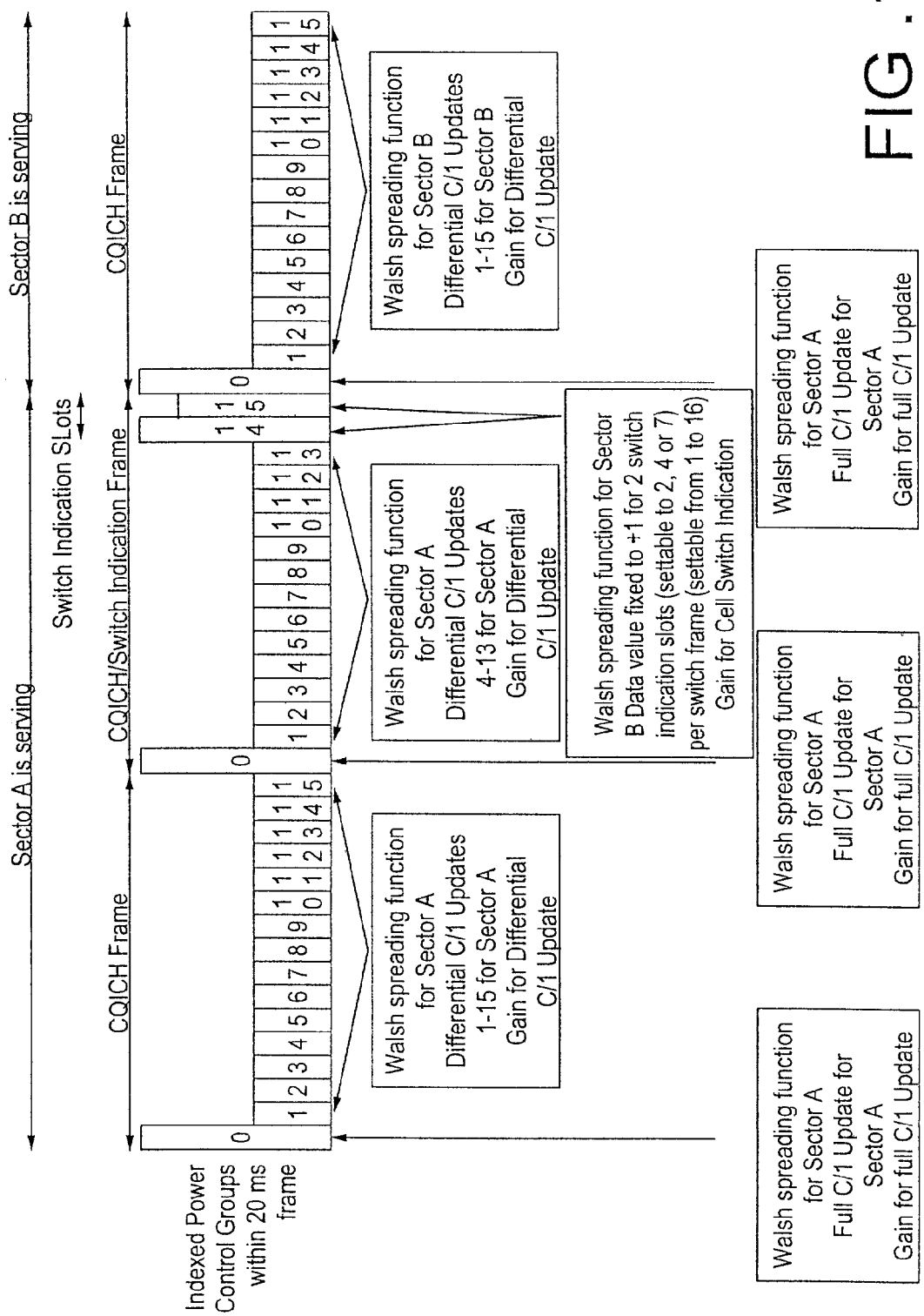
FIG. 1 illustrates the conventional format for signaling a cell switch.
Figure 2:
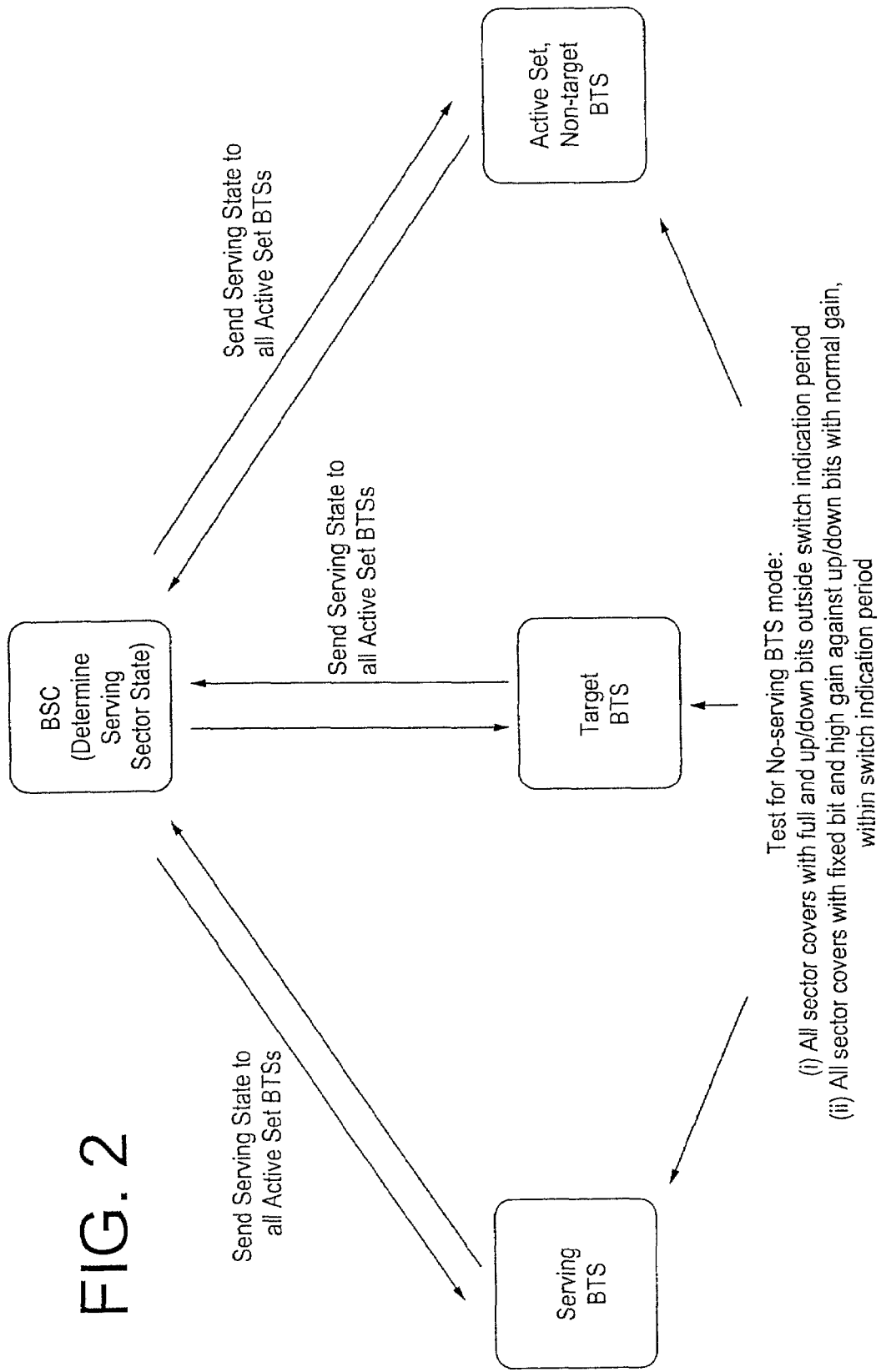
FIG. 2 depicts a flow chart of switch detection performed by the method and network entity.

FIG. 2, which illustrates switch detection in one exemplary embodiment of the present invention and FIG. 3, which illustrates switch detection supervision in one exemplary embodiment of the present invention, will be discussed in more detail below.

As illustrated in FIG. 2, the set of relevant base transceiver stations (BTS) includes the current serving BTS, the target BTS, and any additional active set, non-target BTSs.

Each of the BTSs receives one or more parameters from a mobile of interest and reports the relevant parameters to system equipment, such as a base station controller (BSC). The BSC pools the network parameters from the various BTSs and determines the current status of the mobile using the parameters passed to it from the various BTSs. In an exemplary embodiment of the present invention, the pooled parameter is a confidence metric for each of a plurality of hypotheses, an error metric for each of a plurality of hypotheses, a power up/power down signal, a signal-to-noise ratio of a pilot signal from the mobile or other relevant parameter from the mobile, such as the energy of the pilot signal, and/or a quality indicator from another channel being concurrently transmitted by the mobile. The quality indicator from another channel may be a cyclic redundancy check (CRC) or a frame quality indicator. Further, the other channel may be a reverse fundamental channel (R-FCH) or a reverse dedicated control channel (R-DCCH). As illustrated in FIG. 2, the parameter supplied by the BTS may be a network parameter and the determination made by the BSC is a soft-combination of the parameter supplied. Alternatively, the parameter supplied by the BTS is a network decision and the determination by the BTS is a choice among the decisions made by the parameter supplying BTSs.

In one embodiment of the present invention, the set of BTSs supplying parameters to the BSC may include only the serving BTS and the target BTS. Alternatively, the entity supplying parameters to the BSC could be sectors of a single BTS. Although as illustrated in FIG. 2, the determination step is performed by a BCS, this determination could be performed by other system equipment, or alternatively, could be performed by one of the BTSs. As indicated in FIG. 2, the BSC sends a serving sector state to all of the active set BTSs.

The arrangement illustrated in FIG. 2 is capable of determining the current status of a mobile in the wireless communication system utilizing the pooled network parameters. The current status of a mobile may be its intention to switch to the target BTS, what value of channel quality the mobile has reported to the network during a current frame, or whether the mobile has sent a positive or negative acknowledgement to data transmissions received by the mobile on a forward link. Alternatively, the method and network entity of the present invention may be able to locate a lost mobile, using the above described technique. In an instance where the systems equipment does not know with which BTS a mobile is currently communicating, the technique described above may be utilized to identify the communicating BTS.

As described above, one or more of several parameters may be reported by the reporting BTSs to the BSC, in order for the BSC to make its decision. In the case where a confidence metric for each of a plurality of hypotheses is reported by the BTS, the BSC determines the current status of the mobile by adding the confidence metric for each of the plurality of hypotheses and selecting the hypotheses with the largest cumulative value. In the case where an error metric for a plurality of hypotheses is reported to the BSC, the BSC determines the current status of the mobile by calculating a weighted sum of the error metrics for each of the plurality of hypotheses and selects the hypotheses with the minimum cumulative value. In any arrangement where metrics for a plurality of hypotheses are reported, the BSC may use the metric for all of the possible hypotheses or only the likely hypotheses.

In the case where the parameter supplied by the BTS is power up/power down signal, the BSC determines the current status of the mobile by weighting status information from a BTS supplying a power-down signal greater than the status information from a base transceiver station supplying a power-up signal. In the case where the parameter reported by the BTS is a signal-to-noise ratio of a pilot signal from the mobile or other characteristic of the pilot signal (such as the energy), the BSC determines the current status of the mobile by weighting status information from a BTS supplying a higher signal-to-noise ratio (or energy value) greater than status information from BTS supplying a lower signal-to-noise ratio (or energy value) of the pilot signal from the mobile.

In the event that the parameter reported by the BTS is a quality indicator from another channel, the BSC determines the current status of the mobile by weighting a determination of mobile status by the BTS receiving the another channel with a better quality indicator higher than a determination by another BTS receiving the other channel with a poorer quality indicator. As set forth above, the quality indicator may be a CRC or a frame quality indicator and the other channel may be a reverse fundamental channel (R-FCH) or a reverse dedicated control channel (R-DCCH).

As described above, each of the BTSs may test during and until the end of the switch indication period within each switch indication frame for (i) a fixed bit (+1) on every sectors cover except the serving sector against (ii) up/down bits on the serving sector cover and report the necessary parameters to the BSC. The results of these tests may be aggregated across multiple 20 ms frames.

With respect to the confidence metrics, the BTSs may report the likelihood associated with a detection result and the up/down bits sequence, and/or a pilot SNR.

Figure 3:
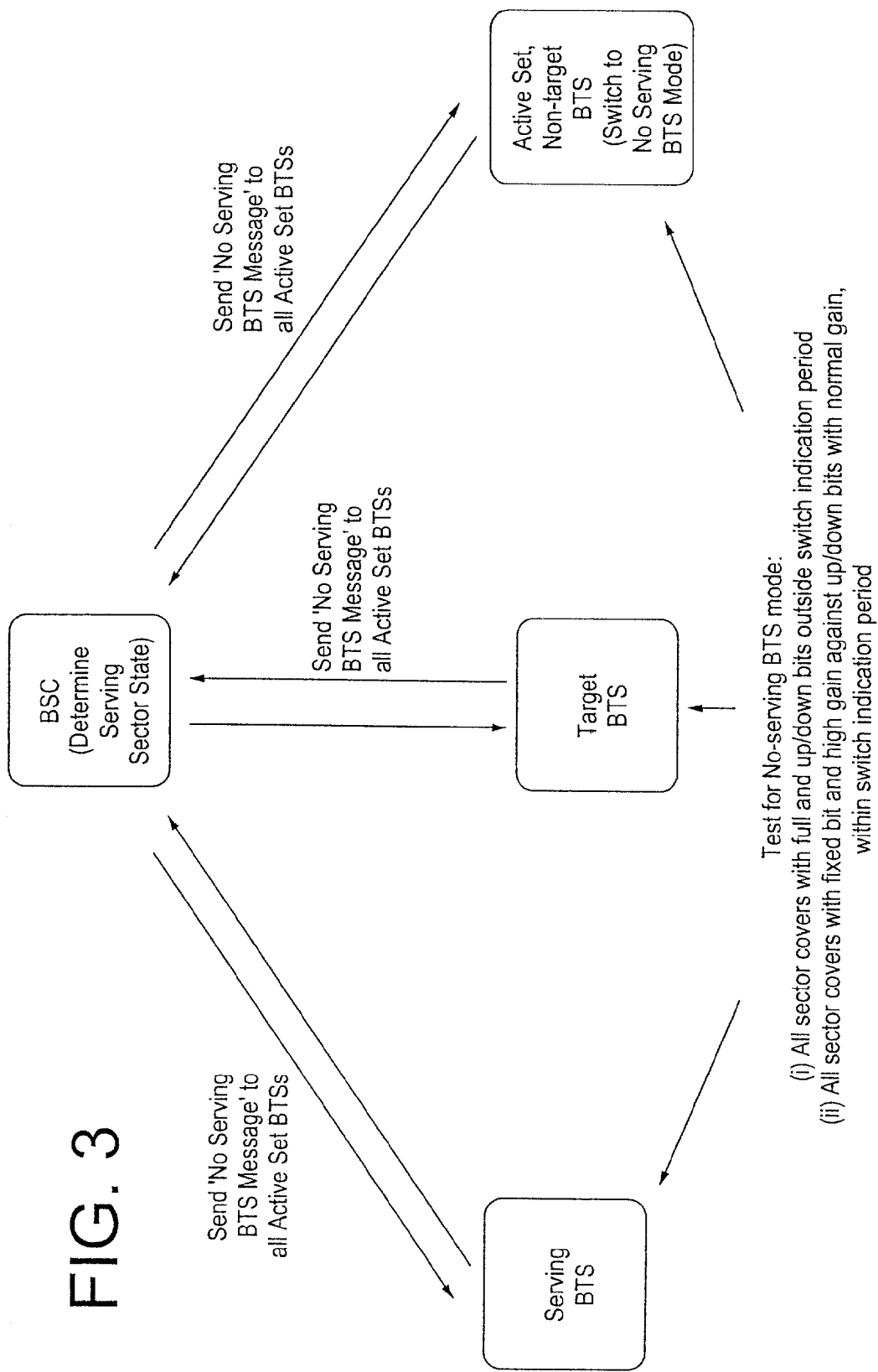
FIG. 3 depicts a flow chart of the switch detection supervision performed by the method and network entity.

FIG. 3 illustrates the situation where the BSC has missed a switch or false detects a switch by the mobile. The BSC determines that no BTS is serving based on additional metrics reporting by the BTSs during regular operation (such as received energy on the R-CQICH using the serving sector cover alone, during the non-switch indication slots) to the BSC. The BSC then sends a 'No serving BTS message' to all active set BTSs.

All BTSs switch to the tests for no-serving BTS mode. In this case the BTSs test all sector covers with full and up/down bits outside the switch indication, and all sectors with repeated fixed bits and high gain against up/down bits with normal (corresponding to up/down bit transmissions) gain, within the switch indication.

The BTSs then report one or more of the parameters identified above, and the BSC determines the BTS the mobile is currently communicating with.

The following description illustrates in more detail how confidence or error metrics from each BTS may be aggregated at the BSC (soft-combining of network parameters) to make a determination of mobile status in the case of cell switching with a single switch indication frame.

If $r_l$ is the received R-CQICH signal at the l-th BTS receiver over the switch indication slots $r_l$ is a vector of complex valued correlator ouputs.

$r_{lij}$ is the received R-CQICH signal at the i-th antenna of the l-th BTS for the j-th switch indication slot. Typically, there are two antennas at each BTS, but there could be more.

$α_l$ is the vector of channel coefficients (attenuation and phase rotation) over the switch indication slots, at the l-th BTS.

$α_{li}$ is the vector of channel coefficients at the i-th antenna of the l-th BTS for the j-th switch indication slot.

$w_m$ represents the m-th 8-ary Walsh function. The transmissions of the mobile on the reverse channel quality indicator channel are covered with such a Walsh function. Change of the Walsh cover is the mechanism by which the mobile may signal an intention to switch from the serving BTS to the target.

$b_k$ is the k-th of the (at most) $2^{Ns}$ possible data sequences over the switch indication period. It is possible that the data sequence is fixed to a certain set of known values during the switch indication period. $N_s$ is the number of switch indication slots within a frame. These switch indication slots may be contiguous or separated. There may be K possible sequences during the switch indication period and K' possible sequences when the mobile is not indicating a switch.

$b_{kj}$ is the j-th bit of $b_k$.

One may use a likelihood ratio test that results in a decision in favor of a switch indication to a certain target BTS if $$\eta \leq \frac{\max_{k \in K, m \neq s} L(\{r_l\}/w_m, b_k)}{\max_{k \in K'} L(\{r_l\}/w_s, b_k)}$$

for some $w_{m \neq s}$ where the subscript s denotes the cover associated with the serving BTS, and $\{r_l\}$ is the set of received signals at the active set BTS.

In the case where the additive noise at each receiver is assumed to be Gaussian, the above likelihood ratio test can be simplified and re-written as $$\eta' \geq \min_{k \in K, m \neq s} \sum_l \frac{\|r_l - \hat{a}_l w_m b_k\|^2}{\sigma_l^2} - \min_{k \in K'} \sum_l \frac{\|r_l - \hat{a}_l w_s b_k\|^2}{\sigma_l^2}$$

which can be decomposed as $$\eta' \geq \min_{k \in K, m \neq s} \sum_{i,j,l} \frac{\|r_{lij} - \hat{a}_{ijl} w_m b_{kj}\|^2}{\sigma_l^2} - \min_{k \in K'} \sum_{i,j,l} \frac{\|r_{lij} - \hat{a}_{ijl} w_s b_{kj}\|^2}{\sigma_l^2}.$$

What the above shows is that, after every N slots (where N could be as small as 1 or as large as Ns), each BTS accumulates an error or confidence metric associated with each hypothesis corresponding to the mobile's current status. These metrics may be forwarded to the BSC which aggregates them to determine the target BTS most likely identified by the mobile.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

We claim:

1. A method of performing network control in which at least one network parameter from at least two active set base transceiver stations are pooled at a base station controller, the method comprising:
   determining a current status of a mobile in a wireless communication system, using each of the at least one pooled network parameters, each of the at least one pooled network parameters including a confidence metric for each hypothesis of a plurality of hypotheses that is reported by each of the at least two active set base transceiver stations to the base station controller,
   wherein the confidence metric associated with each hypothesis is accumulated after every N slots of at least one frame;
   wherein the at least two active set base transceiver stations include a serving base transceiver station and a target base transceiver station and the current status of the mobile is its intention to switch to the target base transceiver station; and
   wherein determining the current status of the mobile includes adding the accumulated confidence metric for each of the plurality of hypotheses and selecting the hypothesis with a largest cumulative value of the accumulated confidence metric.

2. The method of claim 1, wherein the at least one network parameter further includes an error metric from the at least two active set base transceiver stations,
   wherein determining the current status of the mobile includes calculating a weighted sum of the error metrics from the at least two active set base transceiver stations, and selecting the weighted sum with the minimum cumulative value.

3. The method of claim 1, wherein the at least one network parameter further includes a power up/power down signal from the at least two active set base transceiver stations,
   wherein determining the current status of the mobile includes weighting status information from the at least two active set base transceiver stations, and wherein status information supplying a power down signal is weighted greater than status information supplying a power up signal.

4. The method of claim 1, wherein the at least one network parameter further includes a signal-to-noise ratio of a pilot signal from the mobile measured by the at least two active set base transceiver stations,
   wherein determining the current status of the mobile includes weighting status information from the at least two active set base transceiver stations, and wherein status information supplying a higher signal-to-noise ratio of the pilot signal from the mobile is weighted greater than status information supplying a lower signal-to-noise ratio of the pilot signal from the mobile.

5. The method of claim 1, wherein the at least one network parameter further includes an energy parameter of a pilot signal from the mobile measured by the at least two active set base transceiver stations,
   wherein determining the current status of the mobile includes weighting status information from the at least two active set base transceiver stations, and wherein status information supplying a higher energy parameter of the pilot signal from the mobile is weighted greater than status information supplying a lower energy parameter of the pilot signal from the mobile.

6. The method of claim 1, wherein the at least one network parameter further includes a quality indicator from another channel being concurrently transmitted by the mobile,
   wherein determining the current status of the mobile includes weighting a determination of mobile status by the at least two active base transceiver stations, and wherein
   a determination by at least one of the at least two active set base transceiver stations receiving the another channel with a better quality indicator is weighted higher than a determination by at least another of the at least two active set base transceiver stations receiving the another channel with a poorer quality indicator.

7. The method of claim 6, wherein the quality indicator is a cyclic redundancy check (CRC) or a frame quality indicator.

8. The method of claim 6, wherein the another channel is a reverse fundamental channel (R-FCH) or a reverse dedicated control channel (R-DCCH).

9. The method of claim 1, wherein the wireless communications system includes system equipment and the system equipment is the base station controller.

10. The method of claim 1, wherein the wireless communications system includes system equipment and the system equipment is one of the at least two active set base transceiver stations.

11. A network entity for performing network control in a wireless communication system, comprising:
   a processor at a base station controller for pooling at least one network parameter from at least two active set base transceiver stations and determining a current status of a mobile in the wireless communication system, using the pooled network parameters, the pooled network parameters including a confidence metric for each hypothesis of a plurality of hypotheses that is reported by each of the at least two active set base transceiver stations to the base station controller, the confidence metric associated with each hypothesis is accumulated after every N slots of at least one frame, the at least two active set base transceiver stations include a serving base transceiver station and a target base transceiver station and the current status of the mobile is its intention to switch to the target base transceiver station, and
   said processor determining the current status of the mobile by adding the accumulated confidence metric for each of the plurality of hypotheses and selecting the hypothesis with a largest cumulative value of the accumulated confidence metric.

12. The network entity of claim 11, wherein the at least one network parameter further includes an error metric from the at least two active set base transceiver stations,
   said processor determining the current status of the mobile by calculating a weighted sum of the error metrics from the at least two active set base transceiver stations and selecting the weighted sum with the minimum cumulative value.

13. The network entity of claim 11, wherein the at least one network parameter further includes a power up/power down signal from the at least two active set base transceiver stations,
   said processor determining the current status of the mobile by weighting status information from the at least two active set base transceiver stations, and status information supplying a power down signal is weighted greater than status information supplying a power up signal.

14. The network entity of claim 11, wherein the at least one network parameter further includes a signal-to-noise ratio of a pilot signal from the mobile measured by the at least two active set base transceiver stations, said processor determining the current status of the mobile by weighting status information from the at least two active set base transceiver stations, and wherein status information supplying a higher signal-to-noise ratio of the pilot signal from the mobile is weighted greater than status information supplying a lower signal-to-noise ratio of the pilot signal from the mobile.

15. The network entity of claim 11, wherein the at least one network parameter further includes an energy parameter of a pilot signal from the mobile measured by the at least two active set base transceiver stations, said processor determining the current status of the mobile by weighting status information from the at least two active set base transceiver stations and wherein status information supplying a higher energy parameter of the pilot signal from the mobile is weighted greater than status information supplying a lower energy parameter of the pilot signal from the mobile.

16. The network entity of claim 11, wherein the at least one network parameter further includes a quality indicator from another channel being concurrently transmitted by the mobile, said processor determining the current status of the mobile by weighting a determination of mobile status by the at least two active set base transceiver stations, and wherein a determination by at least one of the at least two active set base transceiver stations receiving the another channel with a better quality indicator is weighted higher than a determination by at least another of the at least two active set base transceiver stations receiving the another channel with a poorer quality indicator.

17. The network entity of claim 16, wherein the quality indicator is a cyclic redundancy check (CRC) or a frame quality indicator.

18. The network entity of claim 16, wherein the another channel is a reverse fundamental channel (R-FCH) or a reverse dedicated control channel (R-DCCH).

19. The network entity of claim 11, wherein the network entity is the base station controller.

20. The network entity of claim 11, wherein the network entity is one of the at least two active set base transceiver stations.

* * * * *